United States Patent

[11] 3,622,212

| [72] | Inventor | Roger Laumont<br>Nogent sur Marne, France |
| --- | --- | --- |
| [21] | Appl. No. | 12,215 |
| [22] | Filed | Feb. 18, 1970 |
| [45] | Patented | Nov. 23, 1971 |
| [73] | Assignee | Hydroperfect International |
| [32] | Priority | Feb. 26, 1969 |
| [33] | | France |
| [31] | | 6904922 |

[54] HYDRODYNAMIC LUBRICATION BEARING
7 Claims, 9 Drawing Figs.

[52] U.S. Cl. .................................................. 308/78
[51] Int. Cl. .................................................. F16c 33/66
[50] Field of Search ........................................ 308/121, 122, 240, 78; 418/132, 78

[56] References Cited
UNITED STATES PATENTS
1,556,970  10/1925  Sproat .......................... 308/240
FOREIGN PATENTS
1,471,846  1/1967  France .......................... 308/121

*Primary Examiner*—Martin P. Schwadron
*Assistant Examiner*—Frank Susko
*Attorney*—Breitenfeld & Levine

ABSTRACT: A bearing for a journal lubricated by hydrodynamic lubrication has two helical grooves formed ahead of the load zone of the bearing. One groove has a relatively small pitch angle while the other groove is of greater width and has a much greater pitch angle. Such a bearing arrangement is particularly suitable for supporting stub shafts of gears in high-pressure gear-type pumps and motors.

INVENTOR:
ROGER LAUMONT

HYDRODYNAMIC LUBRICATION BEARING

The present invention concerns an improved hydrodynamic lubrication bearing, more particularly but not exclusively, for high-pressure hydraulic pumps and motors.

BACKGROUND OF THE INVENTION

It is known that the lubrication of bearings is intended to produce an oil film between the journal rotating in the bearing and the bearing, particularly in the load zone of the bearing, that is to say, where the journal exerts the maximum pressure on the bearing.

To produce this oil film, helical grooves are provided in the bearing in known manner, as described for example in French Pat. specification 1,554,858, the circulation of the oil in the grooves resulting from the forces of viscosity and the rotation of the journal.

In the said French patent specification, the number and dimensions of the grooves were determined as a function of a given load and speed of rotation of the journal. Four grooves in particular were provided.

Experience has shown that the supply of lubricating fluid becomes not only insufficient for pressures higher than 400 kg./cm.$^2$ and for speeds which may attain 10,000 rev./min. or more, but also becomes very irregular, due to the fact that at such speed interruptions are produced in the supply of fluid.

SUMMARY OF THE INVENTION

To solve the problem under these new conditions, the present invention provides a bearing comprising two helical grooves having different pitch angles and situated ahead of or upstream of the load zone of the bearing considered in the direction of rotation of the journal, the groove having the smaller pitch angle being nearer the load zone, this groove supplying lubricating fluid, even at very high speeds, to compensate the loss of continuity in fluid supply by the other groove.

In a preferred embodiment of the bearing, the pitch angle of the groove nearer the load zone is 3° and the winding angle of the other groove is 34°, the width of the groove having the small winding angle being 5.5 times less than that of the other groove.

BRIEF DESCRIPTION OF THE DRAWINGS

To understand better how the present invention may be put into practice, a preferred embodiment of the bearing according to the invention will be described in the following in the case of a hydraulic pump, with reference to the accompanying drawings, in which.

DESCRIPTION OF THE PREFERRED EMBODIMENT

Figure 1:
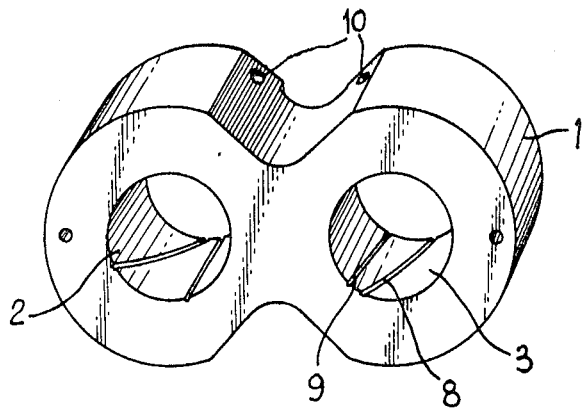
FIGS. 1 and 2 show in perspective a bearing end plate comprising two bearings according to the invention, showing respectively its two faces.
Figure 2:
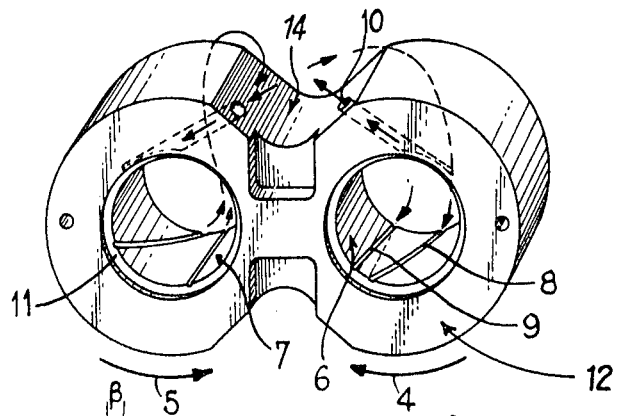

The bearing end plate 1 shown in FIGS. 1 and 2 comprises two bearings 2, 3 intended to support the ends of two journals. Such a bearing end plate is similar to that used in a hydraulic gear pump or motor for supporting the ends of two journals carrying the gears as described in the French specification referred to above.

As the journals rotate in the direction of the arrows 4, 5, the pressure or load zone is situated at 6, 7 in the present case.

Each bearing comprises two helical grooves 8, 9 situated just ahead of the load zone. The groove 8 is a helical groove having a large helix pitch angle $\alpha$, preferably about 34°. The groove 9 is a helical groove having a very small helix pitch angle $\beta$, preferably about 3°. The groove 9 is situated between the load zone and the groove 8 having the large pitch angle; its function is to provide a moderating equilibrium at high speeds.

The direction of helical pitch of the grooves is the same as that of the rotation of the journals.

For moderate speeds of rotation, the large pitch-angle groove 8 ensures the main supply of lubricating fluid, the small pitch-angle groove 9 only provides a very small delivery of lubricating fluid. The rate of flow of lubricating fluid in the groove 8 increases with the speed of rotation of the journal, such that interruptions occur in turbulent flow conditions of the fluid. However, the dimensions and pitch angle of the small pitch-angle groove 9 are selected such that flow in it remains laminar, so that this groove supplies lubricating fluid without interruption, thus compensating the irregularities in the supply from the other groove 8. The pitch angle of the groove 9 is selected to be very small to limit the rate of flow of lubricating fluid in it. Speeds of rotation of 8,000 r.p.m. are attainable.

Figure 3:
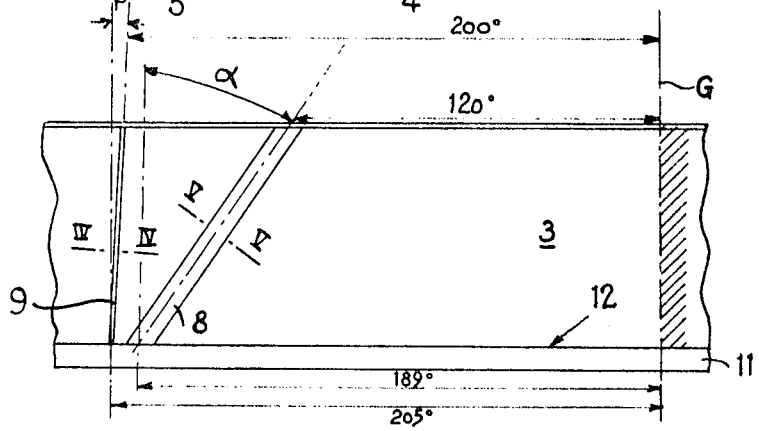
FIG. 3 shows a development of a bearing according to the invention.
Figure 4:
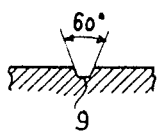
FIG. 4 shows a section of FIG. 3 on the line IV—IV.
Figure 5:
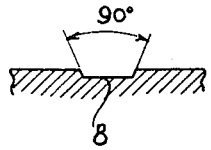
FIG. 5 shows a section of FIG. 3 on the line V—V.
Figure 6:
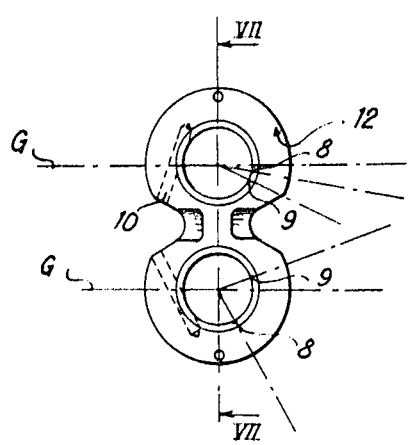
FIG. 6 shows diagrammatically a front view of the bearing end plate of FIGS 1 and 2.
Figure 8:
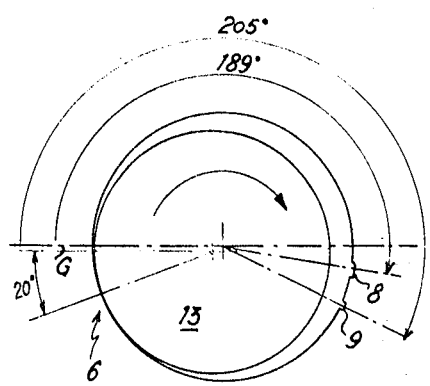
FIG. 8 shows diagrammatically the position of the grooves relative to the load zone of the bearing.
Figure 7:
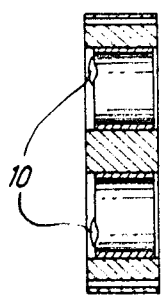
FIG. 7 shows a section of the bearing end plate of FIG. 6 on the line VII—VII.

As preferred example, FIG. 3 shows the starting and end points of the grooves relative to a reference generatrix G in the case of a bearing having a width of 11.5 mm. for receiving a journal 12 mm. in diameter, the annular recess 11 being 1.3 mm. wide. The generatrix G is defined in relation to the load zone 6 with reference to FIG. 7. In this example, the starting point of the small pitch-angle groove 9 on the face of the bearing 12 adjacent the annular recess 11 is at 205° from the generatrix G, the end point being at 200° from the said generatrix on the other face of the bearing. The width of this groove 9 is 0.2 mm. flush with the surface of the bearing and its depth is 0.1 mm., the angle between its walls being 60°. The starting point of departure of the large pitch angle groove 8 is at 189° and its end point is at 120° from the generatrix G. The width of the groove 8 is 1.1 mm. and its depth is 0.1 mm. The walls of this groove make an angle of 90° with each other.

The generatrix G is situated at about 20° from the load zone 6. The zone of application of the journal 13 to the bearing shifts as a function of the speed of rotation. In the example selected, the generatrix G is situated between about 23° and 10° of this load zone, all these dimensions being determined for producing good lubrication between these extremes.

The lubricating liquid follows a lubricating cycle established in the following (or reverse) manner: Low-pressure chamber (preferably suction chamber in the case of a pump), duct 10, annular recess 11, grooves 8, 9 and return to the low-pressure chamber. The direction of the cycle is a function of the direction of rotation of the journal.

The duct 10 opens tangentially into the annular recess 11.

Figure 9:
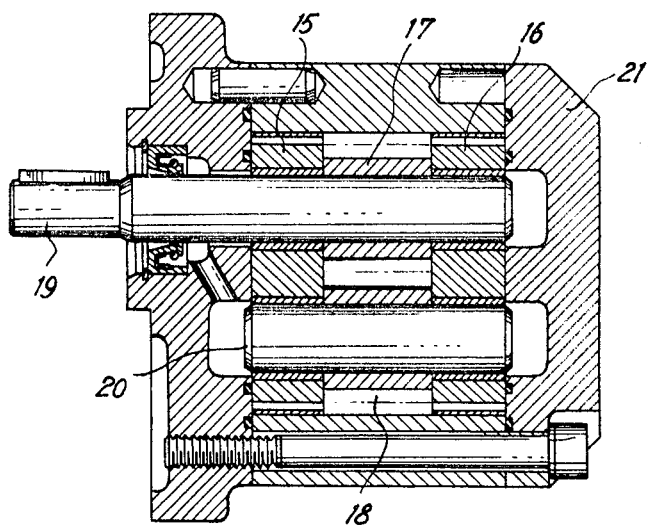
FIG. 9 shows a section of gear pump using bearings according to the invention.

FIG. 9 shows a section through a conventional gear pump comprising two bearing plates 15 and 16 each comprising two bearings according to the invention. This pump comprises two gears 17, 18 mounted on two shafts, consisting of a driving shaft 19 and a driven shaft 20. All these members are mounted in a pump housing 21.

I claim:

1. A bearing arrangement comprising a bearing and a journal rotatably supported within said bearing, said journal exerting a maximum pressure on the bearing in a load zone, said bearing having at least two helical grooves upstream of the load zone with respect to the direction of journal rotation, one of said grooves being closer to the load zone and having a pitch angle of about 3°, and the other groove being farther from the load zone and having a pitch angle of about 34°.

2. A bearing arrangement as defined in claim 1 wherein the cross-sectional flow area of said farther groove is greater than that of said closer groove.

3. A bearing arrangement as defined in claim 1 wherein the width of said farther groove is about 5.5 times as large as the width of said closer groove.

4. A bearing arrangement as defined in claim 1 wherein one end of said closer groove is 225° downstream of the load zone and the other end is 220° downstream of the load zone, and one end of said farther groove is 214° downstream of the load zone and the other end is 145° downstream of the load zone.

5. A bearing arrangement as defined in claim 4 wherein the width of said farther groove is about 5.5 times as large as the width of said closer groove.

6. A bearing arrangement as defined in claim 1 including a support member for said bearing, said support member having an annular recess at one of its edges, a low-pressure chamber, and a lubricating fluid passage duct connecting said recess with said low-pressure chamber.

7. Two side-by-side bearing arrangements as defined in claim 1, the journals of said arrangements rotating in opposite directions about spaced-apart parallel axes, and the helical pitch of the grooves of one of said arrangements being opposite to the helical pitch of the grooves of the other arrangement.

* * * * *